United States Patent
Kakinuma et al.

(10) Patent No.: US 9,231,234 B2
(45) Date of Patent: Jan. 5, 2016

(54) CYLINDRICAL BATTERY

(71) Applicant: PANASONIC CORPORATION, Osaka (JP)

(72) Inventors: Akira Kakinuma, Osaka (JP); Keisuke Yoneda, Osaka (JP); Kenjin Masumoto, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/347,947

(22) PCT Filed: Mar. 29, 2013

(86) PCT No.: PCT/JP2013/002151
§ 371 (c)(1),
(2) Date: Mar. 27, 2014

(87) PCT Pub. No.: WO2013/145768
PCT Pub. Date: Oct. 3, 2013

(65) Prior Publication Data
US 2014/0242448 A1 Aug. 28, 2014

(30) Foreign Application Priority Data

Mar. 30, 2012 (JP) .................. 2012-079165

(51) Int. Cl.
*H01M 2/04* (2006.01)
*H01M 2/02* (2006.01)
(Continued)

(52) U.S. Cl.
CPC ............... *H01M 2/022* (2013.01); *C22C 38/00* (2013.01); *C22C 38/18* (2013.01); *C22C 38/20* (2013.01); *C22C 38/40* (2013.01); *H01M 2/0285* (2013.01); *H01M 2/0413* (2013.01)

(58) Field of Classification Search
None
See application file for complete search history.

(56) References Cited

U.S. PATENT DOCUMENTS 5,580,679 A * 12/1996 Tanaka ..................... 429/185
6,689,512 B2    2/2004 Kimura et al.
(Continued)

FOREIGN PATENT DOCUMENTS

CN    1348223 A    5/2002
EP    1950819 A1   7/2008
(Continued)

OTHER PUBLICATIONS

European Search Report dated Oct. 24, 2014 issued in European Patent Application No. 13768096.3.
(Continued)

*Primary Examiner* — Cynthia K Walls
(74) *Attorney, Agent, or Firm* — McDermott Will & Emery LLP

(57) ABSTRACT

Provided is a small-sized cylindrical battery in which improvement in battery characteristics and improvement in long-term reliability and safety are both realized. The cylindrical battery includes: a bottomed cylindrical battery case 1, an electrode group 5 housed together with an electrolyte in the battery case 1, a sealing member 8 fitted into an opening of the battery case 1, and a gasket 9 interposed between the sealing member 8 and the battery case 1. The opening of the battery case 1 is sealed by applying a drawing process to an opening end portion of the battery case 1. The battery case 1 is constituted of stainless steel. The battery case 1 has an outer diameter of 10 mm or less and a thickness of 0.05 mm or more and 0.2 mm or less.

5 Claims, 1 Drawing Sheet

(51) Int. Cl.
  *C22C 38/00* (2006.01)
  *C22C 38/18* (2006.01)
  *C22C 38/20* (2006.01)
  *C22C 38/40* (2006.01)

(56) References Cited

U.S. PATENT DOCUMENTS

| | | |
|---|---|---|
| 2002/0090549 A1 | 7/2002 | Urade et al. |
| 2004/0214076 A1 | 10/2004 | Tsukamoto et al. |
| 2006/0035147 A1 | 2/2006 | Lam et al. |
| 2008/0248375 A1* | 10/2008 | Cintra et al. ............... 429/94 |
| 2011/0091573 A1 | 4/2011 | Warrell, Jr. et al. |

FOREIGN PATENT DOCUMENTS

| | | |
|---|---|---|
| JP | 09-027304 A | 1/1997 |
| JP | 11-067163 A | 3/1999 |
| JP | 2001-234296 A | 8/2001 |
| JP | 2004-311167 A | 11/2004 |
| JP | 2006-179244 A | 7/2006 |
| JP | 2007-227339 A | 9/2007 |
| JP | 2008-223087 A | 9/2008 |
| JP | 2009-181754 A | 8/2009 |
| WO | 2005/022670 A1 | 3/2005 |
| WO | 2007/142270 A1 | 12/2007 |

OTHER PUBLICATIONS

International Search Report issued in International Application No. PCT/JP2013/002151 mailed Jun. 4, 2013, with English translation, 4 pgs.
Chinese Office Action dated Nov. 2, 2014, issued in correseponding Chinese Patent Application No. 201380002995.9 (English Translation).
Communication dated Jul. 15, 2015 issued in corresponding European Patent Application No. 13768096.3.

\* cited by examiner

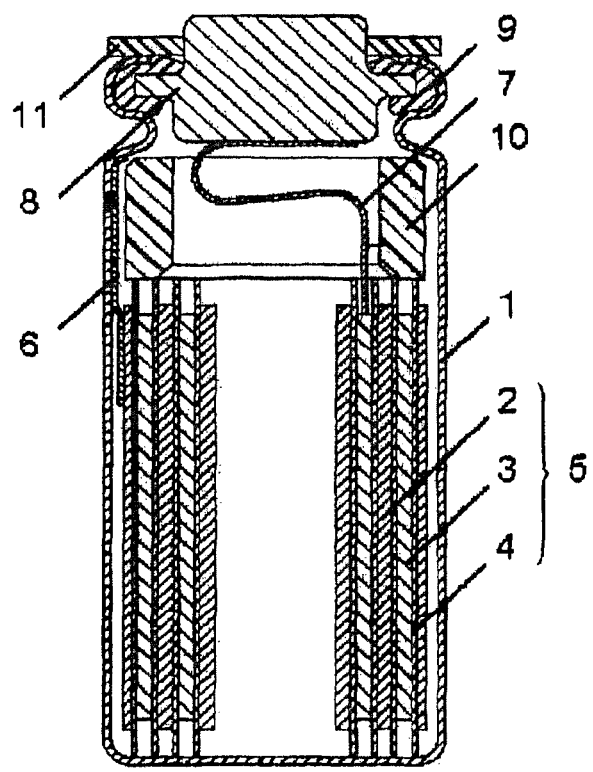

CYLINDRICAL BATTERY

RELATED APPLICATIONS

This application is the U.S. National Phase under 35 U.S.C. §371 of International Application No. PCT/JP2013/002151, filed on Mar. 29, 2013, which in turn claims the benefit of Japanese Application No. 2012-079165, filed on Mar. 30, 2012, the disclosures of which are incorporated by reference herein.

TECHNICAL FIELD

The present invention relates to cylindrical batteries including a battery case, such as lithium ion secondary batteries.

BACKGROUND ART

Lithium ion secondary batteries have been widely used recently in electronic devices such as portable digital devices, as their power sources for driving the electronic devices. Particularly in portable devices such as smart phones that have many functions and need to operate under a heavy load, with respect to the batteries used as their power sources, improvement in battery characteristics such as energy density and load characteristics and reduction in weight are expected. Moreover, improvement in long-term reliability and safety are expected.

Lithium ion secondary batteries typically include a battery case made of metal. Reducing the thickness of the battery case to increase the internal volume and packing a power generation element in the battery case at a high density can improve the energy density. Reducing the thickness of the battery case is particularly effective when the battery size is small, because this can increase the internal volume. As another example, instead of the battery case, a metal-resin laminated sheet is used in some lithium ion batteries. In this example, by using this thin sheet to wrap the battery components such as positive and negative electrodes, separator, and electrolyte, improvement in energy density and reduction in weight can be realized.

CITATION LIST

Patent Literature

[PTL 1] Japanese Laid-Open Patent Publication No. 2009-181754
[PTL 2] Japanese Laid-Open Patent Publication No. 2008-223087
[PTL 3] Japanese Laid-Open Patent Publication No. 2007-227339

SUMMARY OF INVENTION

Technical Problem

In batteries such as lithium ion secondary batteries, however, it has been difficult to realize both improvement in battery characteristics and improvement in long-term reliability and safety. For example, in lithium ion secondary batteries, a battery case is typically made of iron, aluminum or the like. If the thickness of the metal plate constituting the battery case is reduced for improving the energy density, the strength of the battery case is reduced. The reduction in the strength of the battery case results in deteriorated sealing or reduced tolerance to an increase in internal pressure which is caused by electrode-plate swelling and gas generation during repetitive charge/discharge cycles. As a result, deformation of the battery case and deterioration in battery characteristics are more likely to occur, and it becomes difficult to realize long-term reliability.

When a metal-resin laminated sheet is used in place of the battery case, the energy density is improved; however, the problem caused by the reduced battery case strength becomes noticeable. For example, by merely repeating normal charge/discharge cycles, gas generation occurs due to decomposition of the electrolyte, and this increases the internal pressure to cause the battery to swell remarkably. Moreover, since the sealing around the lead portions is insufficient, moisture is likely to enter the interior from the exterior of the battery. The moisture causes gas generation, and this increases the internal pressure to cause the battery to swell. These swellings may damage the sealing by the laminated sheet.

Therefore, in order to improve the battery characteristics, as well as to improve the long-term reliability and safety, it is very important to use a battery case, and in the battery case, to realize high strength and excellent sealing while reducing the thickness thereof.

Under these circumstances, there has been proposed a technique of increasing the thickness of only the opening portion of the battery case, thereby to improve the strength of the opening portion of the battery case, so that excellent sealing can be achieved when the opening portion of the battery case is sealed by crimping (e.g., Patent Literature 1). Such a battery case, however, because of its complicated shape, is difficult to be shaped by molding or produced under quality control, and therefore, is not much suitable for mass-production.

There also has been proposed a technique of using an aluminum alloy material whose strength is improved by addition of another metal and heat treatment, as a material of the battery case (e.g., Patent Literature 2). Merely increasing the strength of the battery case, however, reduces the processability of the battery case, which makes it difficult to realize excellent sealing.

The present invention, therefore, intends to provide a small-sized cylindrical battery in which improvement in battery characteristics and improvement in long-term reliability and safety are both realized.

Solution to Problem

The present inventors have found, as a result of strenuous efforts, the conditions under which improvement in battery characteristics and improvement in long-term reliability and safety can be both realized in a small-sized cylindrical battery.

A cylindrical battery according to the present invention includes: a bottomed cylindrical battery case, an electrode group housed together with an electrolyte in the battery case, a sealing member fitted into an opening of the battery case, and a gasket interposed between the sealing member and the battery case. The opening of the battery case is sealed by applying a drawing process to an opening end portion of the battery case. The battery case is constituted of stainless steel. The battery case has an outer diameter of 10 mm or less. The battery case has a thickness of 0.05 mm or more and 0.2 mm or less.

Advantageous Effects of Invention

According to the cylindrical battery of the present invention, improvement in battery characteristics and improvement in long-term reliability and safety can be both realized.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWING

FIG. 1 A schematic longitudinal cross-section view of a cylindrical battery according to an embodiment of the present invention

DESCRIPTION OF EMBODIMENT

First, the cylindrical battery according to the present invention is described.

The cylindrical battery according to the present invention includes: a bottomed cylindrical battery case, an electrode group housed together with an electrolyte in the battery case, a sealing member fitted into an opening of the battery case, and a gasket interposed between the sealing member and the battery case. The opening of the battery case is sealed by applying a drawing process to an opening end portion of the battery case. The battery case is constituted of stainless steel. The battery case has an outer diameter of 10 mm or less, and a thickness of 0.05 mm or more and 0.2 mm or less.

As shown in Table 1, stainless steel has a remarkably high tensile breaking strength, as compared with iron (Fe) and aluminum (Al). An example of stainless steel shown in Table 1 is SUS316L (austenitic stainless steel). Therefore, when stainless steel is used to constitute the battery case as in the present invention, the high strength thereof is maintained in the battery case, even if the thickness of the battery case is reduced uniformly as a whole. Moreover, despite its high strength, stainless steel is excellent in processability. Therefore, excellent sealing is realized in the battery case.

TABLE 1

| | Specific gravity (g/cm) | Tensile breaking strength (MPa) | Elongation rate (%) |
|---|---|---|---|
| SUS316L | 8.03 | 481 | 40 |
| Fe | 7.78 | 196 | 60 |
| Al | 2.70 | 55 | 30 |

The present inventors have found that excellent sealing can be realized in a small-sized cylindrical battery including a battery case having an outer diameter of 10 mm or less, especially when the battery case has a thickness of 0.05 mm or more and 0.2 mm or less. The present inventors have further found that these conditions are particularly preferable in a small-sized cylindrical battery including a battery case having an outer diameter of 6 mm or less. As described above, the thickness of the battery case is very important as a condition for improving the sealing in a small-sized cylindrical battery when the opening of the battery case is sealed by applying a drawing process to the opening end portion of the battery case.

Upon application of a drawing process to the opening end portion of the battery case, the battery case is constricted (i.e., the diameter of the battery case is reduced) at a portion where the battery case is drawn. When the diameter of the battery case before application of a drawing process is 15 mm or more, the rate of constriction of the battery case (1) by application of a drawing process is small, which has almost no influence on the sealing. When the diameter of the battery case (1) before application of a drawing process is 10 mm or less, however, the rate of constriction of the battery case (1) by application of a drawing process is increased, causing abnormal deformation such as reduction in circularity and creases to easily occur at the opening end portion of the battery case. Such problems are notable when the diameter of the battery case before application of a drawing process is 6 mm or less, and cause the sealing to deteriorate. The present inventors have found that in a small-sized cylindrical battery in which the rate of constriction of the battery case (1) by application of a drawing process is large, excellent sealing can be realized when the battery case (1) is constituted of stainless steel, and the battery case (1) has a thickness of 0.05 mm or more and 0.2 mm or less.

When the cylindrical battery is a lithium ion battery, the battery case is preferably constituted of a material that has a wide potential window and is highly resistant to acid corrosion. In this regard, stainless steel such as SUS316L is very strong against the acid corrosion on the electronegative side, and on the electropositive side, has a wider potential window than iron or copper, although not so wide as aluminum. If an electronegative potential is applied to aluminum under the presence of lithium ions, lithium deposits on the surface of aluminum, and then aluminum forms an alloy with lithium. Such alloying reaction is followed by volume expansion. Therefore, when the battery case is constituted of aluminum, the battery case becomes brittle, and the strength thereof is lowered. Consequently, the long-term reliability of the battery is difficult to realize.

Furthermore, stainless steel is more resistant to acid corrosion than iron, copper and aluminum. This is because stainless steel has a protective layer on its surface. Lithium ion batteries typically include lithium hexafluorophosphate ($LiPF_6$) as a supporting electrolyte. Such a supporting electrolyte can compose a highly ion-conductive electrolyte and realize excellent load characteristics. On the other hand, hydrolysis of lithium hexafluorophosphate occurs under the presence of water, to generate fluorinated acid (HF) being a strong acid. Therefore, in lithium ion batteries, in order to realize long-term reliability, it is important to improve the sealing, thereby to inhibit the entry of moisture from outside, and is also important to improve the acid corrosion resistance of the battery case. This is because the corrosion of the battery case allows the entry of moisture, and accelerates the corrosion.

As described above, according to the cylindrical battery of the present invention, improvement in battery characteristics and improvement in long-term reliability and safety can be both realized. Moreover, the battery case can be made uniform in thickness, and therefore, is easy to be shaped by molding and produced under quality control.

In a preferable specific configuration of the aforementioned cylinder battery, the stainless steel constituting the battery case is an austenitic stainless steel with small carbon content. The stainless steel constituting the battery case is preferably a stainless steel having a carbon content of 0.08 mass % or less. The carbon content in the stainless steel is more preferably 0.05 mass % or less and particularly preferably 0.03 mass % or less.

The stainless steel with low carbon content, as shown in Table 1, has a high elongation rate and a high tensile breaking strength. Therefore, the stainless steel with low carbon content is excellent in processability. In short, in forming the battery case (1), the stainless steel can be processed easily to be thin by stretching, and its processing accuracy is high. For example, for use in a long narrow cylindrical battery, a battery case in which the height-to-diameter ratio is large can be formed easily with high accuracy by, for example, deep-drawing. Therefore, the battery case (1) having a thickness of 0.05 mm or more and 0.2 mm or less can be formed easily with high accuracy, and as a result, a cylindrical battery with excellent sealing can be produced stably.

In another preferable specific configuration of the aforementioned cylinder battery, the stainless steel constituting the battery case (1) is a stainless steel having a copper content of 1.0 mass % or more and 6.0 mass % or less. More preferably, the copper content is 1.5 mass % or more and 5.0 mass % or less. A stainless steel containing copper is excellent in tensile breaking strength, elongation rate, and acid corrosion resistance, and, as shown in Table 2, is low in contact resistance at the stainless steel surface. The surface of stainless steel is usually coated with a protective layer for improving the acid corrosion resistance, and when the stainless steel contains no copper, the protective layer becomes a cause to increase the contact resistance. The inclusion of copper in the stainless steel, however, reduces the resistance of the protective layer, and as a result, the contact resistance is lowered.

TABLE 2

| | Contact resistance (load 40 g) (mΩ) |
| --- | --- |
| Austenitic stainless steel (containing Cu) | 40 |
| Austenitic stainless steel (not containing Cu) | 8000 |

According to a stainless steel containing copper, electrical contact with a device can be easily obtained without the need of an additional surface layer or terminal. Moreover, if the area where it contacts with the electrode within the battery is increased, the internal resistance of the battery is reduced even without bonding the battery case to the electrode by, for example, welding, and as a result, favorable load characteristics can be obtained.

As described above, stainless steel has a high strength. Therefore, processing stainless steel into a desired shape requires a large force. Hence, the battery case is preferably one formed by deep-drawing a thin stainless steel plate into a bottomed cylindrical shape. According to deep-drawing, it is possible to produce battery cases each having a small and uniform thickness, with small variations in shape and thickness. Moreover, according to deep-drawing, the material loss is small. As such, in a cylindrical battery, improvement in battery characteristics and improvement in long-term reliability and safety can be both realized.

Conventional methods for processing stainless steel into a bottomed cylindrical shape include impact pressing, and drawing and ironing (DI) methods. In these methods, however, a large force must be kept applied evenly during mold processing, and the control thereof is difficult. Therefore, the produced battery cases tend to have variations in shape and thickness. Especially when the thickness of the battery case is reduced, the produced battery cases tend to have a pinhole or be torn. Another example of the conventional methods for processing stainless steel into a bottomed cylindrical shape is a method of cutting a cylindrical material. According to this method, the variations in shape among the produced battery cases are unlikely to occur; however, the material loss is large. This method, therefore, is not efficient.

Next, an embodiment of the present invention is specifically described with reference to the drawing. It is to be noted, however, that the configurations of the components of the present invention are not limited to those of the embodiment, and various modifications can be made within the technical scope of the claims.

FIG. 1 is a schematic longitudinal cross-section view of a cylindrical battery according to an embodiment of the present invention. As illustrated in FIG. 1, the cylindrical battery includes a bottomed cylindrical battery case 1, an electrode group 5 housed together with a non-aqueous electrolyte in the battery case 1, a sealing member 8 fitted into the opening of the battery case 1, and a gasket 9 interposed between the sealing member 8 and the battery case 1.

<<Battery Case>>

The battery case 1 is formed by applying a deep-drawing process to a stainless steel material having a uniform thickness. The outer diameter of the battery case 1 is 10 mm or less, and particularly preferably 6 mm or less. The thickness of the battery case 1 is 0.05 mm or more and 0.2 mm or less. The ratio of the thickness of the side wall (side thickness) to the thickness of the bottom (bottom thickness) of the battery case 1 is 0.20 or more and 1.20 or less, and more preferably 0.33 or more and 1.05 or less.

The stainless steel constituting the battery case 1 is preferably an austenitic stainless steel with small carbon content. The stainless steel constituting the battery case 1 is preferably a stainless steel having a carbon content of 0.08 mass % or less. The carbon content in the stainless steel is more preferably 0.05 mass % or less, and particularly preferably 0.03 mass % or less.

The stainless steel constituting the battery case 1 preferably contains copper. In the battery case 1, the copper content is preferably 1.0 mass % or more and 6.0 mass % or less, and more preferably 1.5 mass % or more and 5.0 mass % or less.

<<Sealing Member and Gasket>>

The sealing member 8 and the gasket 9 are members for hermetically sealing the opening of the battery case 1. Specifically, the sealing member 8 and the gasket 9 are inserted in the opening of the battery case 1 such that the gasket 9 is interposed between the sealing member 8 and the battery case 1. Then, a drawing process is applied to an opening end portion of the battery case 1, and the opening end portion is crimped onto the sealing member 8. Accordingly, the gasket 9 is in close contact with the side surface of the sealing member 8 and the inner surface of the battery case 1, in a compressed state therebetween. In this manner, the opening of the battery case 1 is sealed. The sealing member 8 has a protrusion exposed outward from the battery case 1, and a circular plate 11 provided with a hole and made of an electrically insulating material is fitted to the protrusion. The circular plate 11 prevents an electrical short circuit between the sealing member 8 and the battery case 1.

Examples of the material of the gasket 9 include: polypropylene (PP), polyethylene (PE), polyphenylene sulfide (PPS), perfluoroalkyl ethylene-hexafluoropropylene copolymer (PFA), and crosslinked rubbers. Particularly preferred is PFA because it is low in water-vapor permeability and can inhibit the entry of the moisture into the battery which can be a cause of accelerated deterioration of the lithium ion battery.

<<Electrode Group>>

The electrode group 5 has a negative electrode plate 2, a positive electrode plate 3, and a separator 4. In the electrode group 5, the negative and positive electrode plates 2 and 3 are stacked and wound together, with the separator 4 interposed therebetween. The end of winding of at least one of the negative and positive electrode plates 2 and 3 is fixed to the outer peripheral surface of the electrode group 5 with a fixing tape, so that the winding of the electrode group 5 will not become loose. The electrode group 5 is housed together with a non-aqueous electrolyte (not shown) in the battery case 1. According to the electrode group 5, the reaction area is increased, and heavy load characteristics can be realized.

The negative and positive electrode plates 2 and 3 each include a core material serving as a current collector, and a material mixture layer (including active material) formed on a surface of the core material, as described hereinafter. In order to increase the battery capacity, the material mixture layer is formed in a compacted state on the surface of the core material. Therefore, if in the electrode group 5, the radius of the winding start portion of the negative and positive electrode plates 2 and 3 is too small, the material mixture layer may be separated from the core material, which may cause an electrical short circuit (internal short circuit) inside the battery case 1. On the other hand, if the radius of the winding start portion is too large, the amount of active material contained in the battery case 1 is decreased, resulting in a reduced battery capacity. Therefore, the winding of the negative and positive electrode plates 2 and 3 should be started with an appropriate radius. For example, when a winding core is used to wind the negative and positive electrode plates 2 and 3, diameter R of the winding core is preferably 0.6 mm or more and 3.0 mm or less, and particularly preferably 0.8 mm or more and less than 1.5 mm. The electrode group 5 has, around its center axis, a space where the active material is absent. The space is preferably 3.0 mm or less in diameter, and particularly preferably less than 1.5 mm in diameter.

A negative electrode lead 6 is electrically connected to the negative electrode plate 2 (specifically, to a negative electrode core material mentioned hereinafter), and the end of the negative electrode lead 6 is joined to the inner surface of the side wall of the battery case 1 by, for example, spot welding. It is to be noted that when the stainless steel constituting the battery case 1 contains copper, the negative electrode lead 6 may be merely brought into contact with the inner surface of the side wall of the battery case 1. In that way, the negative electrode plate 2 is electrically connected to the battery case 1, allowing the battery case 1 to function as a negative electrode terminal. Examples of the material of the negative electrode lead 6 include nickel, iron, stainless steel, and copper. The negative electrode lead 6 is bendable by a small pressure, and may be of any shape without particular limitation, for example, of the shape of a strip having a welding margin with the negative electrode core material and a welding margin with the battery case 1, or of an oval or polygon inscribing the strip. The thickness of the negative electrode lead 6 is preferably 10 μm or more and 120 μm or less, and particularly preferably 20 μm or more and 80 μm or less.

A positive electrode lead 7 is electrically connected to the positive electrode plate 3 (specifically, to a positive electrode core material mentioned hereinafter), and the end of the positive electrode lead 7 is joined to the sealing member 8 by, for example, spot welding. In that way, the positive electrode plate 3 is electrically connected to the sealing member 8, allowing the sealing member 8 to function as a positive electrode terminal. Examples of the material of the positive electrode lead 7 include aluminum. The positive electrode lead 7 is bendable by a small pressure, and may be of any shape without particular limitation, for example, of the shape of a strip. The thickness of the positive electrode lead 7 is preferably 40 μm or more and 150 μm or less, and particularly preferably 50 μm or more and 100 μm or less.

Disposed between the electrode group 5 and the sealing member 8 is a ring-shaped intermediate member 10 made of an electricity insulating material. The positive electrode lead 7 is passed through the space inside the intermediate member 10 and connected to the positive electrode plate 3 and the sealing member 8. By configuring as above, an electrical short circuit between the positive and negative electrodes is prevented by the intermediate member 10.

<Negative Electrode Plate>

The negative electrode plate 2 comprises a negative electrode core material serving as a negative electrode current collector, and a negative electrode material mixture layer formed on a surface of the negative electrode core material. The negative electrode plate 2 is formed by, for example, depositing a negative electrode active material into the form of thin film on a surface of the negative electrode core material. The negative electrode core material is a metal foil, and may be, for example, a long electrically conductive substrate having a porous or non-porous structure. The material of the negative electrode core material is, for example, stainless steel, nickel, or copper. The thickness of the negative electrode core material is not particularly limited, and is preferably 1 μm or more and 500 μm or less, and particularly preferably 5 μm or more and 20 μm or less. According to the negative electrode core material with such a thickness, the weight of the negative electrode plate 2 can be reduced, while the strength thereof is maintained.

The negative electrode material mixture layer includes a negative electrode active material. The negative electrode active material is specifically described below. The negative electrode material mixture layer preferably includes, for example, a binder, in addition to the negative electrode active material.

(Negative Electrode Active Material)

A material capable of absorbing and releasing lithium ions is used as the negative electrode active material. Examples of such a negative electrode active material include metals, metal fibers, carbon materials, oxides, nitrides, silicon compounds, tin compounds, and various alloy materials. Examples of the carbon materials include various natural graphites, coke, carbon undergoing graphitization, carbon fibers, spherical carbon, various artificial graphites, and amorphous carbon.

Simple substances such as silicon (Si) and tin (Sn), silicon compounds, and tin compounds each have a large capacity density. Therefore, silicon, tin, a silicon compound, or a tin compound is preferably used as the negative electrode active material. Examples of the silicon compound include: $SiO_x$ where $0.05<x<1.95$; and silicon alloys and silicon solid solutions in which Si is partially replaced with at least one elements selected from the group consisting of B, Mg, Ni, Ti, Mo, Co, Ca, Cr, Cu, Fe, Mn, Nb, Ta, V, W, Zn, C, N, and Sn. Examples of the tin compound include: $Ni_2Sn_4$, $Mg_2Sn$, $SnO_x$ where $0<x<2$, $SnO_2$, and $SnSiO_3$. One of the above-exemplified negative electrode active materials may be used singly, or two or more of them may be used in combination, as the negative electrode active material.

<Positive Electrode Plate>

The positive electrode plate 3 comprises a positive electrode core material serving as a positive electrode current collector, and a positive electrode material mixture layer formed on a surface of the positive electrode core material. The positive electrode core material is a metal foil, and may be, for example, a long electrically conductive substrate having a porous or non-porous structure. The material of the positive electrode core material is, for example, aluminum. The thickness of the positive electrode core material is not particularly limited, and is preferably 8 μm or more and 25 μm or less, and particularly preferably 10 μm or more and 15 μm or less. According to the positive electrode core material with such a thickness, the electrode group 5 can be configured to be smoothly curved and have a small diameter.

The positive electrode material mixture layer includes a positive electrode active material, a binder, and a conductive agent. Detailed descriptions of the positive electrode active material, binder, and conductive agent are given below.

(Positive Electrode Active Material)

A preferable example of the positive electrode active material is a lithium-containing composite oxide, examples of which include: $LiCoO_2$, $LiNiO_2$, $LiMnO_2$, $LiCo_xNi_{1-x}O_2$, $LiCo_xM_{1-x}O_2$, $LiNi_xM_{1-x}O_2$, $LiNi_{1/3}CO_{1/3}M_{1/3}O_2$, $LiMn_2O_4$, $LiMnMO_4$, $LiMePO_4$, $Li_2MePO_4F$ (where M is at least one of Na, Mg, Sc, Y, Mn, Fe, Co, Ni, Cu, Zn, Al, Cr, Pb, Sb, and B; x satisfies $0<x<1$; and Me is a metal element containing at least one selected from Fe, Mn, Co, and Ni), and materials in which the elements of these lithium-containing compounds are partially replaced with another element. Other examples of the positive electrode active material include a metal oxide, a lithium oxide, and a positive electrode active material subjected to a surface treatment with a conductive agent or the like. The surface treatment is, for example, hydrophobic treatment.

The positive electrode active material preferably has an average particle diameter of 5 μm or more and 20 μm or less. When the average particle diameter of the positive electrode active material is less than 5 μm, the surface area of active material particles is extremely large. This requires an extremely large amount of binder for obtaining a bonding strength that enables the handling of the positive electrode plate 3. Consequently, the amount of active material per electrode plate is decreased, resulting in a decreased capacity. On the other hand, when more than 20 μm, in coating the positive electrode core material with a positive electrode material mixture slurry, coating lines are likely to occur.

(Binder)

Examples of the binder include: PVDF, polytetrafluoroethylene, polyethylene, polypropylene, aramid resin, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyether sulfone, hexafluoropolypropylene, styrene-butadiene rubber, and carboxymethyl cellulose. Other examples thereof include: a copolymer or mixture obtained by copolymerizing or mixing two or more materials selected from tetrafluoroethylene, hexafluoroethylene, hexafluoropropylene, perfluoroalkyl vinylether, vinylidene fluoride, chlorotrifluoroethylene, ethylene, propylene, pentafluoropropylene, fluoromethylvinyl ether, acrylic acid, and hexadiene.

Among the above-exemplified binders, in particular, PVDF and derivatives thereof are chemically stabile in non-aqueous electrolyte secondary batteries, and provide sufficient bonding between the positive electrode material mixture layer and the positive electrode core material, as well as sufficient bonding among the positive electrode active material, binder, and conductive agent constituting the positive electrode material mixture layer, making it possible to obtain favorable charge/discharge cycle characteristics and discharge performance. Therefore, PVDF and derivatives thereof are preferably used as the binder of the present embodiment. In addition, PVDF and derivatives thereof are inexpensive, and therefore, are preferable in terms of costs, too. In the case of producing a positive electrode including PVDF as a binder, for example, in producing the positive electrode, PVDF may be used by being dissolved in N-methylpyrrolidone, or powdery PVDF may be used by being dissolved in the positive electrode material mixture slurry.

(Conductive Agent)

Examples of the conductive agent include: graphites, such as natural graphite and artificial graphite; carbon blacks, such as acetylene black (AB), Ketjen black, channel black, furnace black, lamp black, and thermal black; conductive fibers, such as carbon fibers and metal fibers; fluorinated carbon; metal powders, such as aluminum powder; conductive whiskers, such as zinc oxide whiskers and potassium titanate whiskers; conductive metal oxides, such as titanium oxide; and organic conductive materials, such as phenylene derivatives.

<Separator>

The separator 4 may be a microporous thin film, woven fabric, or non-woven fabric which is highly ion permeable and has a predetermined mechanical strength and electrically insulating property. In particular, the separator 4 is preferably made of a polyolefin, such as polypropylene or polyethylene. A polyolefin has excellent durability and shutdown function, and therefore, can improve the safety of lithium ion secondary batteries.

The thickness of the separator 4 is typically 10 μm or more and 300 μm or less, and preferably 10 μm or more and 40 μm or less. The thickness of the separator 4 is more preferably 15 μm or more and 30 μm or less, and particularly preferably 10 μm or more and 25 μm or less. When the separator 4 is a microporous thin film, the microporous thin film may be a single-layered film constituted of one material, or may be a composite or multi-layered film constituted of one material or two or more materials. The porosity of the separator 4 is preferably 30% or more and 70% or less, and particularly preferably 35% or more and 60% or less. The porosity as used herein means a ratio of the total volume of pores to the overall volume of the separator 4.

<Non-Aqueous Electrolyte>

The non-aqueous electrolyte contained in the battery case 1 may be a liquid, gel, or solid non-aqueous electrolyte. A liquid non-aqueous electrolyte includes an electrolytic salt (e.g., a lithium salt) and a non-aqueous solvent for dissolving the electrolytic salt. A gel electrolyte includes a non-aqueous electrolyte and a polymer material for retaining the non-aqueous electrolyte. Examples of the polymer material include: polyvinylidene fluoride, polyacrylonitrile, polyethylene oxide, polyvinyl chloride, polyacrylate, and polyvinylidene fluoride hexafluoropropylene. A solid non-aqueous electrolyte includes a polymer solid electrolyte.

The non-aqueous solvent and electrolytic salt included in a liquid non-aqueous electrolyte are described below in detail.

(Non-Aqueous Solvent)

The non-aqueous solvent for dissolving the electrolytic salt may be any known non-aqueous solvent. The non-aqueous solvent may be of any type without particular limitation, and is, for example, a cyclic carbonic acid ester, chain carbonic acid ester, or cyclic carboxylic acid ester. Examples of the cyclic carbonic acid ester include: propylene carbonate (PC), and ethylene carbonate (EC). Examples of the chain carbonic acid ester include: diethyl carbonate (DEC), ethylmethyl carbonate (EMC), and dimethyl carbonate (DMC). Examples of the cyclic carboxylic acid ester include: gamma(γ)-butyrolactone (GBL), and gamma(γ)-valerolactone (GVL). One of the above-exemplified non-aqueous solvents may be used singly, or two or more of them may be used in combination, as the non-aqueous solvent.

(Electrolytic Salt)

The electrolytic salt to be dissolved in the non-aqueous solvent may be, for example, $LiClO_4$, $LiAlCl_4$, $LiSbF_6$, LiSCN, $LiCF_3SO_3$, $LiCF_3CO_2$, $LiAsF_6$, lithium lower aliphatic carboxylate, LiCl, LiBr, LiI, chloroborane lithium, borates, or imides. Examples of borates include: lithium bis(1,2-benzenediolato(2-)-O,O')borate, lithium bis(2,3-naphthalenediolato(2-)-O,O')borate, lithium bis(2,2'-biphenyldiolato(2-)-O,O')borate, and lithium bis(5-fluoro-2-olato-1-benzene sulfonato-O,O')borate. Examples of imides include: lithium bis(trifluoromethanesulfonyl)imide (($CF_3SO_2)_2$NLi), lithium nonafluorobutanesulfonyl trifluoromethanesulfonyl imide (LiN($CF_3SO_2$)($C_4F_9SO_2$)), and lithium bis(pentafluoroethanesulfonyl)imide (($C_2F_5SO_2)_2$NLi). One of the above-exemplified electrolytic salts may be used singly, or two or more of them may be used in combination, as the electrolytic salt.

The amount of the electrolytic salt dissolved in the non-aqueous solvent is preferably 0.5 mol/$m^3$ or more and 2 mol/$m^3$ or less.

The liquid non-aqueous electrolyte may contain, in addition to the electrolytic salt and non-aqueous solvent, for example, an additive that will dissolve on the negative electrode to form a highly lithium-ion conductive coating and enhance the charge/discharge efficiency of the battery. Examples of the additive with such function include: vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinylethylene carbonate (VEC), and divinylethylene carbonate. One of the above-exemplified additives may be used singly, or two or more of them may be used in combination, as the additive. Particularly preferred among the above-exemplified additives is at least one selected from the group consisting of vinylene carbonate, vinylethylene carbonate, and divinylethylene carbonate. The additive may be one in which some of hydrogen atoms in the above-exemplified additive are replaced with fluorine atoms.

Furthermore, the liquid non-aqueous electrolyte may contain, in addition to the electrolytic salt and non-aqueous solvent, for example, a known benzene derivative that will dissolve during overcharging to form a coating on the electrode and inactivate the battery. The benzene derivative with such function is preferably one having a phenyl group and a cyclic compound group adjacent to the phenyl group. Examples of the benzene derivative include: cyclohexylbenzene, biphenyl, and diphenyl ether. The cyclic compound group included in the benzene derivative is exemplified by a phenyl group, cyclic ether group, cyclic ester group, cyclo-alkyl group, or phenoxy group. One of the above-exemplified benzene derivatives may be used singly, or two or more of them may be used in combination, as the benzene derivative. The amount of the benzene derivative contained in the non-aqueous solvent is preferably 10 vol % or less of the whole non-aqueous solvent.

EXAMPLES

Examples of the present invention are specifically described below.

Example 1

Production of Positive Electrode Plate

As the positive electrode active material, $LiNi_{0.82}Co_{0.15}Al_{0.03}O_2$ having an average particle diameter of 10 μm was prepared. As the binder, 4.7 vol % PVDF per 100 vol % of the positive electrode active material was prepared. As the conductive agent, 4.5 vol % acetylene black per 100 vol % of the positive electrode active material was prepared. Moreover, N-methylpyrrolidone (NMP) was prepared as the solvent, and the prepared binder was dissolved in the solvent to give a solution. The prepared positive electrode active material, conductive agent, and solution were mixed together, to give a positive electrode material mixture slurry.

Next, a 15-μm-thick aluminum foil was prepared as the positive electrode core material, and the positive electrode material mixture slurry was applied onto both surfaces of the aluminum foil, and then dried. Thereafter, the positive electrode core material with the positive electrode material mixture slurry applied and dried on both surfaces thereof was rolled, to form a sheet-like 0.12-mm-thick plate for positive electrode. The plate for positive electrode was cut in the size of 30.5 mm wide and 19.0 mm long, to produce a positive electrode plate 3 having a thickness of 0.12 mm, a width of 30.5 mm and a length of 19.0 mm.

(Production of Negative Electrode Plate)

As the negative electrode active material, flake graphite having an average particle diameter of 20 μm was prepared. As the binder, 4.7 vol % SBR per 100 vol % of the negative electrode active material was prepared. As the conductive agent, 4.5 vol % acetylene black per 100 vol % of the negative electrode active material was prepared. Moreover, pure water was prepared as the solvent, and the prepared binder was dissolved in the solvent to give a solution. The prepared negative electrode active material, conductive agent, and solution were mixed together, to give a negative electrode material mixture slurry.

Next, an 8-μm-thick copper foil was prepared as the negative electrode core material, and the negative electrode material mixture slurry was applied onto both surfaces of the copper foil, and then dried. Thereafter, the negative electrode core material with the negative electrode material mixture slurry applied and dried on both surfaces thereof was rolled, to form a sheet-like 0.15-mm-thick plate for negative electrode. The plate for negative electrode was cut in the size of 29.5 mm wide and 37.0 mm long, to produce a negative electrode plate 2 having a thickness of 0.15 mm, a width of 29.5 mm and a length of 37.0 mm.

(Preparation of Non-Aqueous Electrolyte)

As the non-aqueous solvent, a mixed solvent of 1:3 (volume ratio) ethylene carbonate and dimethyl carbonate was prepared. As the electrolytic salt, $LiPF_6$ was prepared. To the prepared non-aqueous solvent, 5 wt % vinylene carbonate was added as an additive for enhancing the charge/discharge efficiency of the battery, and $LiPF_6$ serving as the electrolytic salt was dissolved in the non-aqueous solvent at a mole concentration of 1.4 mol/$m^3$, to prepare a non-aqueous electrolyte.

(Production of Cylindrical Battery)

First, a positive electrode lead 7 made of aluminum was attached to the positive electrode core material of the prepared positive electrode plate 3, and a negative electrode lead 6 made of nickel was attached to the negative electrode core material of the prepared negative electrode plate 2. Subsequently, the negative and positive electrode plates 2 and 3 were wound with a separator 4 made of polyethylene (thickness: 16 μm) interposed therebetween, to form an electrode group 5. Moreover, SUS316L (austenitic stainless steel containing no copper and 0.03 mass % or less carbon) was used to form a battery case 1 having a thickness of 0.1 mm and an outer diameter of 3.5 mm.

Next, an intermediate member 10 was placed on the top end of the electrode group 5. The negative electrode lead 6 was welded to the battery case 1, and the positive electrode lead 7 was welded to a sealing member 8. The electrode group 5 was housed in the battery case 1. Thereafter, the non-aqueous electrolyte was injected under reduced pressure into the battery case 1. The sealing member 8 and a gasket 9 made of PFA were then inserted into the opening of the battery case 1, such that the gasket 9 was interposed between the battery case 1 and the sealing member 8. The opening end portion of the battery case 1 was crimped onto the sealing member 8. In that manner, a cylindrical battery having a diameter of 3.5 mm and a height of 35 mm was produced. This cylindrical battery was referred to as Example 1.

Example 2

Austenitic stainless steel containing 3.80 mass % copper was used as the stainless steel constituting the battery case 1. The production conditions other than the above were the same as those for Example 1. A cylindrical battery produced in that manner was referred to as Example 2.

Example 3

SUS316L was used as the material constituting the battery case 1, and the thickness of the battery case 1 (outer diameter: 3.5 mm) was set to 0.15 mm. The production conditions other than the above were the same as those for Example 1. A cylindrical battery produced in that manner was referred to as Example 3.

Example 4

SUS316L was used as the material constituting the battery case 1, and the thickness of the battery case 1 (outer diameter: 3.5 mm) was set to 0.20 mm. The production conditions other than the above were the same as those for Example 1. A cylindrical battery produced in that manner was referred to as Example 4.

Comparative Example 1

SUS316L was used as the material constituting the battery case 1, and the thickness of the battery case 1 (outer diameter: 3.5 mm) was set to 0.25 mm. The production conditions other than the above were the same as those for Example 1. A cylindrical battery produced in that manner was referred to as Comparative Example 1.

Comparative Example 2

Iron (Fe) was used as the material constituting the battery case 1 (thickness: 0.1 mm, and outer diameter: 3.5 mm). The production conditions other than the above were the same as those for Example 1. A cylindrical battery produced in that manner was referred to as Comparative Example 2.

Comparative Example 3

Iron (Fe) was used as the material constituting the battery case 1, and the thickness of the battery case 1 (outer diameter: 3.5 mm) was set to 0.2 mm. The production conditions other than the above were the same as those for Example 1. A cylindrical battery produced in that manner was referred to as Comparative Example 3.

Five cylindrical batteries were produced for each of Examples 1 to 4 and Comparative Examples 1 to 3, and with respect to these batteries, the average energy density, occurrence rate of electrolyte leakage, and occurrence rate of internal short circuit were determined. The results are shown in Table 3. Here, the occurrence rate of internal short circuit is an occurrence rate of short circuit measured by pressing the side wall of the cylindrical battery with a tip of a round rod of 1.0 mm in diameter, and in this state, applying a stress of 1.5 kgf.

TABLE 3

| | Battery case | | | | | Characteristics | | |
|---|---|---|---|---|---|---|---|---|
| | Material | Cu (Mass %) | C (Mass %) | Thickness (mm) | Outer diameter (mm) | Energy density (Wh/L) | Occurrence rate of electrolyte leakage (%) | Occurrence rate of internal short circuit (%) |
| Ex. 1 | SUS316L | 0 | <0.03 | 0.10 | 3.5 | 385 | 0 | 0 |
| Ex. 2 | SUS | 3.80 | <0.03 | 0.10 | 3.5 | 385 | 0 | 0 |
| Ex. 3 | SUS316L | 0 | <0.03 | 0.15 | 3.5 | 362 | 0 | 0 |
| Ex. 4 | SUS316L | 0 | <0.03 | 0.20 | 3.5 | 340 | 0 | 0 |
| Com. Ex. 1 | SUS316L | 0 | <0.03 | 0.25 | 3.5 | 318 | 80 | 0 |
| Com. Ex. 2 | Fe | — | — | 0.10 | 3.5 | 385 | 20 | 80 |
| Com. Ex. 3 | Fe | — | — | 0.20 | 3.5 | 339 | 80 | 0 |

The cylindrical batteries of Examples 1 to 4 and Comparative Examples 1 to 3 were further subjected to a long-term reliability test. Specifically, these batteries were stored in an 85° C.-90% RH atmosphere for 20 days, and then the swelling rate of the battery case 1 and the battery capacity retention rate were determined. Here, as the swelling rate of the battery case 1, the ratio of increase in the outer diameter of the battery case 1 was determined. The capacity retention rate was determined relative to the initial battery capacity. The results are shown in Table 4.

TABLE 4

| | Battery case | | | | Characteristics | |
|---|---|---|---|---|---|---|
| | Material | Cu (Mass %) | C (Mass %) | Thickness (mm) | Outer diameter (mm) | Swelling rate (%) | Capacity retention rate (%) |
| Ex. 1 | SUS316L | 0 | <0.03 | 0.10 | 3.5 | 0 | 75 |
| Ex. 2 | SUS | 3.80 | <0.03 | 0.10 | 3.5 | 0 | 75 |
| Ex. 3 | SUS316L | 0 | <0.03 | 0.15 | 3.5 | 0 | 75 |
| Ex. 4 | SUS316L | 0 | <0.03 | 0.20 | 3.5 | 0 | 50 |
| Com. Ex. 1 | SUS316L | 0 | <0.03 | 0.25 | 3.5 | 0 | 8 |
| Com. Ex. 2 | Fe | — | — | 0.10 | 3.5 | 18 | 10 |
| Com. Ex. 3 | Fe | — | — | 0.20 | 3.5 | 4 | 30 |

Comparison between Examples 1 to 4 and Comparative Example 1 in Table 3 shows that: the energy density was small in Comparative Example 1 in which the thickness of the battery case 1 was large; and the smaller the thickness of the battery case 1 was, the larger the energy density was. This was because the internal volume of the battery case 1 (in which a power generation element is to be housed) increases, as the thickness of the battery case 1 is reduced.

Comparison between Example 1 and Comparative Example 2 in Tables 3 and 4 reveals the following difference, although the thicknesses of the battery cases 1 were the same, 0.10 mm. In Comparative Example 2 in which the material of the battery case 1 was iron, an internal short circuit was likely to occur, and the battery case 1 was likely to swell; whereas in Example 1 in which the material of the battery case 1 was SUS316L, no internal short circuit occurred, and the battery case 1 did not swell. This was attributed to that: SUS316L has a higher strength than iron (Fe), and accordingly, the strength of the battery case 1 constituted of SUS316L was high. As for the swelling of the battery case 1 in Comparative Example 2, it was presumably attributed to hydrogen gas generated under the influence of moisture having entered the battery case.

Comparison between Examples 1 to 4 and Comparative Example 1 in Table 3 shows that: although the materials and the outer diameters of the battery cases 1 were the same, SUS316L and 3.5 mm, in Comparative Example 1 in which the thickness of the battery case 1 was 0.25 mm, electrolyte leakage was likely to occur; whereas in Examples 1 to 4 in which the thicknesses of the battery cases 1 were 0.20 mm or less, no electrolyte leakage occurred. In short, excellent sealing was realized in Examples 1 to 4. This was because in Examples 1 to 4, no abnormality in shape such as reduction in circularity or creases occurred, and consequently, no channel through which electrolyte leaks was formed.

Comparison between Examples 1 to 4 and Comparative Example 1 in Table 4 shows that: although the materials of the battery cases 1 were the same, SUS316L, in Comparative Example 1 in which the thickness of the battery case 1 was 0.25 mm, the capacity retention rate was significantly low; whereas in Examples 1 to 4 in which the thicknesses of the battery cases 1 were 0.20 mm or less, the capacity retention rates were as high as 50% or more. This was because in Examples 1 to 4, no abnormality in shape such as reduction in circularity or creases occurred, and consequently, evaporation of electrolyte and entry of moisture from outside were suppressed.

On the other hand, in Comparative Examples 2 and 3 in which the materials of the battery cases 1 were iron (Fe), the capacity retention rates were significantly low. This was because, due to the low strength of the battery cases 1, the battery cases 1 easily swelled in association with generation of hydrogen gas, and consequently, the sealing (c.f., the occurrence rate of electrolyte leakage in Table 3) deteriorated, causing the battery characteristics to deteriorate. Furthermore, presumably, the battery case corroded by the generated fluorinated acid being a strong acid, and the corrosion allowed the entry of moisture, by which the corrosion was accelerated, failing to maintain the high battery capacity.

Comparison between Example 1 and Example 2 in Tables 3 and 4 shows that: even though copper was contained in the stainless steel constituting the battery cases 1, the copper had no adverse effect on the battery characteristics and long-term reliability. The copper contained in the stainless steel lowers the contact resistance at the surface of the stainless steel.

The foregoing results revealed the following: to enhance the strength of the battery case 1, it is preferable to use stainless steel as the material of the battery case 1. This makes an internal short circuit unlikely to occur. In addition to the above, it is preferable to set the thickness of the battery case 1 to be 0.2 mm or less. This improves the energy density and improves the sealing and capacity retention rate, and as a result, improvement in battery characteristics and improvement in long-term reliability and safety can be both realized.

Example 5

SUS316L was used as the material constituting the battery case 1, and the outer diameter of the battery case 1 (thickness: 0.1 mm) was set to 6 mm. The production conditions other than the above were the same as those for Example 1. A cylindrical battery produced in that manner was referred to as Example 5.

Example 6

SUS316L was used as the material constituting the battery case 1, and the outer diameter of the battery case 1 (thickness: 0.1 mm) was set to 10 mm. The production conditions other than the above were the same as those for Example 1. A cylindrical battery produced in that manner was referred to as Example 6.

Comparative Example 4

SUS316L was used as the material constituting the battery case 1, and the outer diameter of the battery case 1 (thickness: 0.1 mm) was set to 15 mm. The production conditions other than the above were the same as those for Example 1. A cylindrical battery produced in that manner was referred to as Comparative Example 4.

Comparative Example 5

SUS316L was used as the material constituting the battery case 1, and the thickness and the outer diameter of the battery case 1 were set to 0.2 mm and 15 mm, respectively. The production conditions other than the above were the same as those for Example 1. A cylindrical battery produced in that manner was referred to as Comparative Example 5.

Comparative Example 6

Iron (Fe) was used as the material constituting the battery case 1, and the outer diameter of the battery case 1 (thickness: 0.1 mm) was set to 6 mm. The production conditions other than the above were the same as those for Example 1. A cylindrical battery produced in that manner was referred to as Comparative Example 6.

Comparative Example 7

Iron (Fe) was used as the material constituting the battery case 1, and the outer diameter of the battery case 1 (thickness: 0.1 mm) was set to 10 mm. The production conditions other than the above were the same as those for Example 1. A cylindrical battery produced in that manner was referred to as Comparative Example 7.

Comparative Example 8

Iron (Fe) was used as the material constituting the battery case 1, and the outer diameter of the battery case 1 (thickness: 0.1 mm) was set to 15 mm. The production conditions other than the above were the same as those for Example 1. A cylindrical battery produced in that manner was referred to as Comparative Example 8.

Comparative Example 9

Iron (Fe) was used as the material constituting the battery case 1, and the thickness and the outer diameter of the battery case 1 were set to 0.2 mm and 15 mm, respectively. The production conditions other than the above were the same as those for Example 1. A cylindrical battery produced in that manner was referred to as Comparative Example 9.

Five cylindrical batteries were produced for each of Examples 1, 5 and 6 and Comparative Examples 2 and 4 to 9, and with respect to these batteries, the occurrence rate of electrolyte leakage, occurrence rate of internal short circuit, and battery capacity retention rate were determined. The results are shown in Table 5. Here, the occurrence rate of internal short circuit is an occurrence rate of short circuit measured by pressing the side wall of the cylindrical battery with a tip of a round rod of 1.0 mm in diameter, and in this state, applying a stress of 1.5 kgf. The battery capacity retention rate was determined after the cylindrical batteries had been stored in an 85° C.-90% RH atmosphere for 20 days. The capacity retention rate was determined relative to the initial battery capacity.

TABLE 5

| | Battery case | | | | | Characteristics | | |
| --- | --- | --- | --- | --- | --- | --- | --- | --- |
| | Material | Cu (Mass %) | C (Mass %) | Thickness (mm) | Outer diameter (mm) | Occurrence rate of electrolyte leakage (%) | Occurrence rate of internal short circuit (%) | Capacity retention rate (%) |
| Ex. 1 | SUS316L | 0 | <0.03 | 0.10 | 3.5 | 0 | 0 | 75 |
| Ex. 5 | SUS316L | 0 | <0.03 | 0.10 | 6 | 0 | 0 | 75 |
| Ex. 6 | SUS316L | 0 | <0.03 | 0.10 | 10 | 20 | 0 | 75 |
| Com. Ex. 4 | SUS316L | 0 | <0.03 | 0.10 | 15 | 60 | 20 | 60 |
| Com. Ex. 5 | SUS316L | 0 | <0.03 | 0.20 | 15 | 0 | 0 | 75 |
| Com. Ex. 2 | Fe | — | — | 0.10 | 3.5 | 20 | 80 | 10 |
| Com. Ex. 6 | Fe | — | — | 0.10 | 6 | 20 | 80 | 10 |
| Com. Ex. 7 | Fe | — | — | 0.10 | 10 | 40 | 80 | 5 |
| Com. Ex. 8 | Fe | — | — | 0.10 | 15 | 40 | 80 | 5 |
| Com. Ex. 9 | Fe | — | — | 0.20 | 15 | 0 | 0 | 75 |

Comparison between Examples 1, 5 and 6 and Comparative Example 4 in Table 5 revealed the following difference, although the materials and the thicknesses of the battery cases 1 were the same, SUS316L and 0.10 mm. In Comparative Example 4 in which the outer diameter of the battery case 1 was 15 mm, an internal short circuit was likely to occur; whereas in Examples 1, 5 and 6 in which the outer diameters of the battery cases 1 were 10 mm or less, no internal short circuit occurred. This was for the following reason: even though the battery case 1 is constituted of SUS316L with high strength, when the outer diameter of the battery case 1 is large, the curvature of the side wall of the battery case 1 is small, which makes the battery case 1 likely to deform under external force. In contrast, when the outer diameter of the battery case 1 is small, the curvature of the side wall of the battery case 1 is large, which makes the battery case 1 unlikely to deform under external force.

On the other hand, in Comparative Examples 2 and 6 to 8 in which the battery cases 1 were constituted of iron (Fe), the occurrence rates of internal short circuit were significantly high. This was because the strength of the battery cases 1 was low, and accordingly, the battery cases 1 were likely to deform under external force. Moreover, in Comparative Examples 2 and 6 to 8, because of the low strength of the battery cases 1, electrolyte leakage was likely to occur. Furthermore, in Comparative Examples 2 and 6 to 8, the capacity retention rates were significantly low. This was because, due to the low strength of the battery cases 1, the battery cases 1 easily swelled in association with generation of hydrogen gas, and consequently, the sealing deteriorated, causing the battery characteristics to deteriorate. Furthermore, presumably, the battery case corroded by the generated fluorinated acid being a strong acid, and the corrosion allowed the entry of moisture, by which the corrosion was accelerated, failing to maintain the high battery capacity.

The foregoing results revealed the following: to enhance the strength of the battery case 1, it is preferable to use stainless steel as the material of the battery case 1. This makes an internal short circuit unlikely to occur. In addition to the above, it is preferable to set the outer diameter of the battery case 1 to be 10 mm or less. This improves the sealing and the capacity retention rate, and as a result, improvement in battery characteristics and improvement in long-term reliability and safety can be both realized. It is to be noted that the results of Comparative Examples 5 and 9 revealed the following: when the outer diameter of the battery case 1 is large (larger than 10 mm), the long-term reliability and the safety can be improved by increasing the thickness of the battery case 1 regardless of what material constitutes the battery case 1; however, when the outer diameter of the battery case 1 is small (10 mm or smaller), by increasing the thickness of the battery case 1, the internal volume thereof is significantly reduced, and moreover, the sealing by a drawing process becomes difficult to perform, failing to obtain sufficient sealing.

Example 7

SUS316 (austenitic stainless steel containing 0.08 mass % or less carbon) was used as the material constituting the battery case 1. The production conditions other than the above were the same as those for Example 1. A cylindrical battery produced in that manner was referred to as Example 7.

Comparative Example 10

SUS430 (ferritic stainless steel containing 0.12 mass % or less carbon) was used as the material constituting the battery case 1. The production conditions other than the above were the same as those for Example 1. A cylindrical battery produced in that manner was referred to as Comparative Example 10.

Five cylindrical batteries were produced for each of Examples 1 and 7, and with respect to these batteries, the occurrence rate of electrolyte leakage and the battery capacity retention rate were determined. The results are shown in Table 6. Here, the battery capacity retention rate was determined after the cylindrical batteries had been stored in an 85° C.-90% RH atmosphere for 20 days. The capacity retention rate was determined relative to the initial battery capacity.

TABLE 6

| | Battery case | | | | | Characteristics | |
| --- | --- | --- | --- | --- | --- | --- | --- |
| | Material | Cu (Mass %) | C (Mass %) | Thickness (mm) | Outer diameter (mm) | Occurrence rate of electrolyte leakage (%) | Capacity retention rate (%) |
| Ex. 1 | SUS316L | 0 | <0.03 | 0.10 | 3.5 | 0 | 75 |
| Ex. 7 | SUS316 | 0 | <0.08 | 0.10 | 3.5 | 20 | 55 |

Table 6 shows that in Examples 1 and 7 in which the carbon contents were 0.08 mass % or less, electrolyte leakage was unlikely to occur, and the capacity retention rates were high. It was revealed that a preferable carbon content is 0.03 mass % or less.

A stainless steel with low carbon content has, as shown in Table 1, a large elongation rate and a high tensile breaking strength. As such, a stainless steel with low carbon content is excellent in processability. This means that, in forming the battery case 1, such a stainless steel is easily processed thinly by stretching, and its processing accuracy is high. Therefore, the battery case 1 having a small thickness can be formed easily with high accuracy, and as a result, a cylindrical battery with excellent sealing can be produced stably.

The foregoing results revealed that: the stainless steel constituting the battery case preferably has a carbon content of 0.08 mass % or less, and particularly preferably has a carbon content of 0.03 mass % or less. This improves the sealing and capacity retention rate, and as a result, improvement in battery characteristics and improvement in long-term reliability and safety can be both realized.

Example 8

In Example 2, a cylindrical battery was produced under the condition that the negative electrode lead 6 was simply brought into contact with the battery case 1, instead of being welded thereto. The production conditions other than the above were the same as those for Example 2. A cylindrical battery produced in that manner was referred to as Example 8.

Example 9

In Example 1, a cylindrical battery was produced under the condition that the negative electrode lead 6 was simply brought into contact with the battery case 1, instead of being welded thereto. The production conditions other than the above were the same as those for Example 1. A cylindrical battery produced in that manner was referred to as Example 9.

With respect to the cylindrical batteries of Examples 8 and 9, the internal resistance was determined. The results are shown in Table 7.

TABLE 7

| | Battery case | | | | Characteristics |
|---|---|---|---|---|---|
| Material | Cu (Mass %) | C (Mass %) | Thickness (mm) | Outer diameter (mm) | Internal resistance (Ω) |
| Ex. 8 SUS | 3.80 | <0.03 | 0.10 | 3.5 | 1 |
| Ex. 9 SUS316L | 0 | <0.03 | 0.10 | 3.5 | 20 |

Table 7 shows that, under the condition that the negative electrode lead 6 was simply brought into contact with the battery case 1, Example 9 containing no copper exhibited a significantly high internal resistance, whereas Example 8 containing copper exhibited a remarkably low internal resistance. In short, addition of copper to an austenitic stainless steel lowers the contact resistance at the surface of the stainless steel.

This was for the following reason: the surface of stainless steel is usually coated with a protective layer for improving the acid corrosion resistance, and when the stainless steel contains no copper, the protective layer becomes a cause to increase the contact resistance. The inclusion of copper in the stainless steel, however, reduces the resistance of the protective layer, and as a result, the contact resistance is lowered.

Therefore, by adding copper to the stainless steel constituting the battery case 1, it is possible to omit the welding between the battery case 1 and the negative electrode lead 6. Moreover, in the cylindrical battery (Example 2) in which the negative electrode lead 6 is welded to the battery case 1, even when, for example, the welding is broken during use, the internal resistance is kept low as long as the negative electrode lead 6 is in contact with the battery case 1.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

A cylindrical battery according to the present invention can be used in various electronic devices such as portable digital devices, as their power source.

REFERENCE SIGNS LIST

1 Battery case
2 Negative electrode plate
3 Positive electrode plate
4 Separator
5 Electrode group
6 Negative electrode lead
7 Positive electrode lead
8 Sealing member
9 Gasket
10 Intermediate member
11 Circular plate

The invention claimed is:
1. A cylindrical battery comprising:
a bottomed cylindrical battery case having an open end portion,
an electrode group housed together with an electrolyte in the battery case,
a sealing member fitted into the open end portion of the battery case, and
a gasket interposed between the sealing member and the battery case, the open end portion of the battery case crimped onto the sealing member so as to seal the battery case, wherein
the battery case is constituted of stainless steel,
the battery case has an outer diameter of 10 mm or less, and
the battery case has a thickness of 0.05 mm or more and 0.2 mm or less.
2. The cylindrical battery according to claim 1, wherein the stainless steel constituting the battery case is an austenitic stainless steel.
3. The cylindrical battery according to claim 1, wherein the stainless steel constituting the battery case is a stainless steel having a carbon content of 0.08 mass % or less.
4. The cylindrical battery according to claim 1, wherein the stainless steel constituting the battery case is a stainless steel having a copper content of 1.0 mass % or more and 6.0 mass % or less.
5. The cylindrical battery according to claim 1, wherein the battery case has an outer diameter of 6 mm or less.

* * * * *